United States Patent Office 2,938,931
Patented May 31, 1960

2,938,931

MANUFACTURE OF TRI- AND TETRA-CHLORETHYLENE

Robert Thermet, Grenoble, and Ludovic Parvi, Pont de Claix, France, assignors to Societe d'Electro-Chimie d'Electro-Metallurgie et des Acieries Electriques d'Ugine, Paris, France, a corporation of France No Drawing. Filed Feb. 3, 1958, Ser. No. 712,650

Claims priority, application France Feb. 19, 1957

2 Claims. (Cl. 260—654)

The present invention relates to a method of preparation of trichlor- and tetrachlor-ethylene in a single phase by direct reaction of chlorine and acetylene.

In view of the practical advantage of such a direct reaction and the risks of explosion which it involves, the direct chlorination of acetylene by chlorine has been the subject of numerous studies.

Certain methods rely on the production of a high speed in the reaction zone, generally with the formation of flame, but they do not exclude the dilution of the chlorine-acetylene mixture by inert gases; they involve the formation of large quantities of secondary products such as hexachlor-ethane and chloro-benzenes, and generally they result in the production of tetrachlorethylene only.

Other methods propose the dilution of the chlorine-acetylene mixture by inert gases and the passage of this new mixture over a catalyst kept at a high temperature. As a diluent, nitrogen, hydrochloric acid, and various organic substances have been employed; thus, in accordance with French Patent No. 832,750 of January 28, 1938, there is mixed either one volume of acetylene with three volumes of chlorine and twelve to fifteen volumes of nitrogen, or alternatively 1 volume of acetylene, about 3 volumes of chlorine and 25 volumes of hydrochloric acid, with the object of obtaining tetrachlor-ethylene.

An excess of chlorine has also been employed; such a method however results in obvious drawbacks, since then chlorine remains in the gases passing out of the reaction zone; in addition, it is impossible to obtain industrially an advantageous proportion of trichlor-ethylene, and finally the formation of the tetrachlor-ethylene is accompanied therein by the formation of undesirable by-products such as hexachloro-ethane and hexachloro-benzene.

Generally speaking, it can be said that these known methods lead to the production of tetrachlor-ethylene to the exclusion of substantial quantities of trichlor-ethylene and often mixed with carbon tetrachloride, and form undesirable by-products such as lamp-black, hexachloro-benzene, tarry products, and chlorinated derivatives with several atoms of carbon; in addition they often have a low efficiency and the life of the catalysts which they employ is industrially of short duration.

There has also been proposed a method of simultaneous production of trichlor- and tetrachlor-ethylene in two successive catalytic phases, which consist in mixing together acetylene, chlorine, hydrochloric acid as a diluent, and preferably chlorinated hydrocarbons and in subjecting the gaseous mixture to two successive phases of catalysis, carried out at different temperatures, the temperature of the second phase being the higher; it is indicated that it is an advantage to introduce only part of the chlorine necessary into the inlet side of the first phase.

Finally, French Patent No. 1,078,095 of June 5, 1953, describes a method of manufacture of trichlorethylene, in which acetylene is converted to 1,2 dichlorethylene, passing from this latter by known means to tetrachlor-ethane, and finally from the latter product to trichlor-ethylene. In accordance with the method described in the said patent the action of cupric chloride in a hydrochloric solution, on acetylene is employed in passing from acetylene to dichlor-ethylene; the cupric chloride, which is reduced during the course of this action to the form of cuprous chloride, is re-oxidised during the course of a separate stage by various agents such as chlorine or a mixture of oxygen and hydrochloric acid.

The applicants have continued their researches on the chlorination of acetylene with a view to the production of trichlor- and tetrachlor-ethylene; these researches have led to the discovery that it is possible to obtain mixtures of trichlor- and tetrachlor-ethylene containing at will from 0 to 75% by weight of trichlor-ethylene by direct and complete reaction of chlorine and acetylene in the presence of an organic diluent produced by the reaction in a single phase of chlorination, without the formation of appreciable quantities of heavy chlorinated products such as hexachloro-benzene, hexachlor-ethane and tarry products.

The present invention relates to a method of manufacture of a mixture of trichlor-ethylene and tetrachlor-ethylene containing at will from 0 to 75% by weight of trichlor-ethylene by the complete reaction of chlorine and acetylene in a single reaction stage, without appreciable formation of heavy products, which consists essentially in passing, over a solid mass maintained in the fluidized state known as the fixed dense phase, at a constant temperature comprised between 350 and 450° C., a mixture of chlorine and acetylene proportioned as a function of the proportion desired of trichlor-ethylene and tetrachlor-ethylene, and of an organic diluent mixture constituted by products passing out of the reaction zone, mainly dichlor-ethylene, tetrachlor- and pentachlor-ethane and tetrachlor-ethylene. The applicants have discovered the entirely unforeseen fact that, by re-cycling the said products as constituent parts of the diluent in accordance with the method of the invention, there is rapidly reached in continuous operation a condition of balance, in which the quantity of chlorinated derivatives other than trichlor- and tetrachlor-ethylene present in the gaseous mixture passing out of the reaction zone, is equal to the quantity of these same chlorinated derivatives which were introduced into the said zone; the result is that after the establishment of this condition of balance, the chlorine and acetylene introduced are almost wholly converted to trichlor- and tetrachlor-ethylene. For this reason, it is not necessary to prevent, at the outlet of the reaction zone, the presence in the gaseous mixture of the chlorinated derivatives such as dichlor-ethylene or tetrachlor- or pentachlor-ethane.

In carrying the method into effect, the nature and the composition of the gaseous mixture at the outlet of the reaction zone depend on the catalytic activity of the fluidized solid mass, and especially on its activity as a dehydrochlorinating agent.

By fluid state in a fixed dense phase, as opposed to the fluid condition known as the diluted phase, there is meant a condition in which the density of the fluidized material only differs slightly from that of a powder; in this state, the mass which is capable of flowing like a fluid, remains in the chamber in which it has been placed; only those particles which are too fine, produced in general by the abrasion of the particles against each other, are carried away by the flow of gas out of the fluidized mass; they may be retained by a dust-extractor and then led back into the mass or recovered.

If the fluidized solid mass has only a weak dehydrochlorinating action, there is furthermore obtained at the outlet of the reaction zone, all other conditions remaining equal, a gaseous mixture which is relatively rich in tetrachlor- and/or pentachlor-ethane, reaching for example a content of 30% in tetrachlor-ethane and 6% in pentachlor-ethane. As a mass with weak de-hydrochlorinating action, there may be cited active carbon with small specific surface area, fuller's earth and silica gel. The impregnation of these substances with cupric chloride slightly improves their de-hydrochlorinating action.

If, on the contrary the fluidized solid mass has a strong de-hydrochlorinating action, the gaseous mixture passing out of the reaction zone does not contain or contains only very little tetrachlor- and/or pentachlor-ethane. As a mass of this type there may be cited active carbon impregnated with cupric chloride and barium chloride.

It is well known that at the temperatures employed, the catalysts do not keep for very long their initial activity, and especially their de-hydrochlorinating action. In accordance with the present method, the tetrachlor- and pentachlor-ethane and, if desired, tetrachlor-ethylene and/or trichlor-ethylene are re-cycled, and the activity of the catalyst is fixed as a function of the desired composition of the re-cycled gases. It is for example possible to use either a mass which has very low activity in consequence of its nature, or a mass which is initially very active but the activity of which has been greatly reduced as a result of a long period of use, then arriving at a state of balance at which the activity of the fluidized mass remains constant for a very long time, and which corresponds to a fixed proportion of tetrachlor- and/or pentachlor-ethane in the gases passing out of the reaction zone and consequently in the diluent. Thus, a highly active mass consisting of active carbon impregnated with cupric chloride and barium chloride has its activity reduced substantially at the end of about 100 hours, at the end of which period appreciable quantities of tetrachlor- and pentachlor-ethane can be seen to appear; from this moment, a condition of balance is fairly rapidly established at which the quantity of dichlor-ethylene, of pentachlor- and tetrachlor-ethane passing out of the reaction zone is equal to the quantity introduced, for which condition there is practically a complete conversion of the chlorine-acetylene mixture to trichlor- and tetrachlor-ethylene.

It is known that the reaction of addition of chlorine to acetylene is very rapid, and that on the contrary a de-hydrochlorination generally requires an appreciable time, of the order of several multiples of ten seconds. The method in accordance with the invention requires a period of contact of the gases, that is to say a period of passage of the gases through the fluidized solid layer, which varies with the practical degree of activity of the catalyst, but which, with a catalyst of average activity and an average content of tetrachlor- and pentachlor-ethane in the gases passing out of the reaction zone, for example .25% and 4% respectively, may, if desired, be less than 10 seconds; this duration may be greater than that value without any disadvantage.

Whatever the degree of its activity may be, the fluidized mass should have a granular size which permits of its fluidization under the conditions of speed adopted for the gas. This granular size is preferably of the order of 100 microns for a speed of gas of 5 cm. per sec. and of the order of 500 microns for a speed of 25 cm. per sec. The presence of a proportion of 5 to 10% of finer particles does not present any drawback and even enables the phenomenon of abrasion of the mass to be reduced.

A further important feature of the method in accordance with the invention resides in the maintenance of the activity of the catalyst within the desired limits. This maintenance may be obtained by different means: for example the mass may be replaced as a whole when its activity has fallen to the lower limit fixed. In accordance with an alternative, it is also possible to withdraw periodically, at a fixed rate or at fixed intervals which may be for example of the order of 24 or 48 hours, a small portion of the catalytic mass comprised between 1 and 10% of the total mass and to replace it by fresh catalyst. The applicants have found that in this way it is possible to maintain the activity of the catalyst indefinitely within the desired limits, the consumption of catalyst remaining very much less—at least two or three times smaller—than if the entire mass is replaced when its activity becomes smaller.

In accordance with a further alternative form of the method, the carrying-away of the fine particles by the flow of gas out of the reaction zone may also be regulated in such manner that the quantity of catalyst thus carried away is at least equal to and preferably slightly greater than the quantity of catalyst which it is desired to remove during the same time as a result of its loss of activity. These fine particles are then retained in an external chamber; their excess with respect to the quantity of catalyst which is to be removed, and therefore to be replaced, is mixed with the quantity of fresh catalyst which it is desired to add, and this mixture is re-introduced into the fluid layer; in such a process, there is no advantage in using a catalyst of low resistance to abrasion which would give a very large quantity of fine particles, since this would result in a high consumption of catalyst due, not to its ageing, but to the physical effect of abrasion.

The relative volumes of chlorine and acetylene employed depend in the first place on the desired proportion of trichlor- and tetrachlor-ethylene; the total conversion of one volume of acetylene to trichlor-ethylene requires in fact two volumes of chlorine, whilst the total conversion of the same volume of acetylene to tetrachlor-ethylene requires three volumes of chlorine.

The volume of diluent used in accordance with the invention may be kept low with respect to those which are generally proposed. The ratio of this volume of the diluent to the volume of acetylene can be reduced without any risk of explosion, to 6 and even less. In carrying the invention into effect, the diluent will, as provided above, be composed of tetrachlor-ethylene and dichlor-ethylene if the fluidized mass has a strong de-hydrochlorinating action; in general, the diluent is composed of tetrachlor-ethylene, dichlor-ethylene, and tetrachlor- and pentachlor-ethane, the proportion of these latter derivatives being bound up with the activity of the fluidized mass. This diluent may also contain trichlor-ethylene if it is only desired to draw-off tetrachlor-ethylene from the operation; in this case, the trichlor-ethylene at the outlet of the reaction zone is recycled.

As far as the choice of the temperature to be maintained is concerned, the applicants have found that the method is not advantageous for temperatures less than 350° C., since the contact times would then be too long and the maintenance of the reaction temperature would require a supplement of heat. By working at temperatures higher than 450° C., there would be obtained the advantage of a still shorter time of contact, but in that case an appreciable quantity of heavy products would appear in the gases passing out of the reaction zone at the same time as the chlorine; the period of life of the catalyst would then be too short and it would be necessary to re-cycle too large quantities of tetrachlor- and pentachlor-ethane. Between the limits of 350 to 450° C., the method of the invention gives especially favourable results in the zone from 370 to 400° C.

The gases eliminated from the reaction zone are not sufficient to evacuate the whole of the heat developed by the reaction, which is strongly exothermic, so that it is necessary to ensure the cooling of the fluidized mass.

An important advantage of the method in accordance with the invention consists in that as a result of the state of the said mass, it is possible, even in the case of an industrial apparatus having a low ratio of surface to volume, to sufficiently evacuate heat by the surface of the apparatus, for example by blowing air, and thus to avoid the use of a tubular water-circulation device, costly to buy and to maintain and which, in spite of its complexity, would not enable a uniform temperature to be obtained in the reaction zone. Cooling may also be effected, at least in part, by the injection of all or part of the diluent in the liquid form into the interior of the fluidized mass, and preferably into the lower portion of that mass.

An additional advantage resides in the economy in installation and in catalyst due to the small dimensions of the apparatus which give a high production, and which are made possible by the small contact time and the high speeds employed in the reaction zone.

The gases passing out of the reaction zone may be isolated by any known process. A simple method consists, for example, in separating from it the organic products by washing at a temperature of about 100° C. with a solution of condensed products and in cooling to a low temperature (for example 20° C.) the resulting hydrochloric vapours (so as to condense the majority of the organic vapours carried away) before sending them to the point of utilization. If this utilization comprises the absorption of the hydrochloric acid in water, it is easy to recover and put back in the cycle the small quantity still present of organic materials which have been carried away.

The products condensed by washing and/or by cooling are subsequently dried and then sent into a rectifying column, at about two-thirds of its height; a boiler is provided at the lower part of the column which delivers to its upper part dichlor-ethylene vapours which may carry with them very small quantities of trichlor-ethylene. After condensation, this liquid dichlor-ethylene is brought back to the input of the reactor through the intermediary of a storage tank in which it may be vaporized. The liquid passing out of the base of the column contains trichlor-ethylene, tetrachlor-ethylene, and in general tetrachlor- and pentachlor-ethane. This liquid is led into a further column—at about three quarters of its height—so as to separate the trichlor-ethylene vapours at the head and at its base a liquid constituted by tetrachlor-ethylene, in general together with tetrachlor- and pentachlor-ethane. This liquid is subjected to a fresh distillation in order to separate from it the tetrachlor-ethylene produced from the tetrachlor- and the pentachlor-ethane and from the initial tetrachlor-ethylene, which are brought back to the inlet of the reaction zone.

The description given below provides various examples (without any implied limitation) of the application of the invention:

In Examples I and II, the trichlor-ethylene represents 73% of the total of the molecules formed; in Example III, it represents 78%; and in Example IV, it corresponds to 18.5% of the molecules formed.

*Example I*

A reactor was employed, the external wall of which was provided with fins intended to increase the heat-exchange surface with the outer atmosphere. This reactor contained as a catalyst active carbon, the particles of which had a diameter comprised between 200 and 300 microns and which were impregnated with 20% of its weight of cupric chloride. During the entire course of the operation, the reaction mixture fluidizing the catalyst in fixed dense phase was maintained at a space velocity under standard conditions of 225 metres per hour and at a linear speed based on the total section of 15 cm. per sec. During the entire course of the operation, the temperature of the reaction zone was kept at 375° C. by regulating the rate of flow of a current of air directed onto the outer wall of the reactor.

In order to obtain a molar proportion of 73 of trichlor-ethylene to 27 of tetrachlor-ethylene, the initial reaction mixture contained 2.30 mols. of chlorine per mol. of acetylene.

At the outset of the operation, the reactor was supplied with a gaseous mixture containing, per mol. of acetylene, 2.30 mols. of chlorine and 6 mols. of tetrachlor-ethylene; the gases passing out of the reaction zone were then composed of:

0.03 mol. of dichlor-ethylene,
0.30 mol. of trichlor-ethylene,
6.30 mols. of tetrachlor-ethylene,
0.25 mol. of tetrachlor-ethane,
0.04 mol. of pentachlor-ethane,
1.06 mols. of hydrochloric acid.

There was eliminated from these gases the hydrochloric acid, the trichlor-ethylene, and a relatively large quantity of tetrachlor-ethylene, and the remaining portion was re-cycled to the reactor after having added to it chlorine and acetylene in the proportion of 2.30 mols. of chlorine to 1 mol. of acetylene, the total of the organic molecules being in a ratio in the vicinity of 6 with the acetylene.

The mixture passing out of the reaction zone became gradually richer in dichlor-ethylene, trichlor-ethylene, tetrachlor-ethane, pentachlor-ethane, and hydrochloric acid, and became poorer in tetrachlor-ethylene. This evolution was continued until a state of practical balance was reached (after about 48 hours) in which there was introduced into the reactor, per molecule of acetylene:

2.30 mols. of chlorine,
0.30 mol. of dichlor-ethylene,
4.29 mols. of tetrachlor-ethylene,
1.15 mols. of tetrachlor-ethane,
0.26 mol. of pentachlor-ethane, which gave:

0.30 mol. of dichlor-ethylene,
0.61 mol. of trichlor-ethylene,
4.60 mols. of tetrachlor-ethylene,
1.15 mols. of tetrachlor-ethane,
0.26 mol. of pentachlor-ethane,
1.35 mols. of hydrochloric acid.

In this practically stationary condition, there has been produced 0.61 mol. of trichlor-ethylene for 0.31 mol. of tetrachlor-ethylene; this condition was maintained for 150 hours and the operation was then stopped. This state of stability could have been still further prolonged, it was however found experimentally that prolongation of the operation up to the moment when the catalyst would have had to be entirely replaced as a result of its ageing, results in a consumption of catalyst of the order of 15 to 50 grams per kilogram of the mixture of trichlor- and tetrachlor-ethylene.

*Example II*

In a second operation tending to obtain the same proportions of trichlor-ethylene and tetrachlor-ethylene, the working was first carried out as in Example I. During the course of the stationary condition, about 10% of the catalyst was carried away. After having completed the quantity of catalyst by the addition of 10% of fresh catalyst, the operation was continued. At the end of a transitional period, which was shorter than in the previous case and amounted to about 24 hours, a practically stable state was reached substantially identical with that previously obtained.

*Example III*

It was desired to obtain a proportion of 78% of trichlor-ethylene in the total of trichlor- and tetrachlor-ethylene obtained.

The operation was carried out with the same reactor and catalyst as in the preceding example; the gaseous mixture introduced into the reactor contained however 2.2 molecules of chlorine per molecule of acetylene; its space velocity was 270 metres per hour and its linear speed was 15 cm. per sec.; the reaction temperature was maintained at 395° C.

In the first place, there was introduced into the reactor a gaseous mixture containing, per molecule of acetylene, 2.2 mols. of chlorine and 6 mols. of tetrachlorethylene. As in the previous example, a practically stable condition was rapidly reached at which the quantities of dichlor-ethylene, tetrachlor-ethane and pentachlor-ethane passing out of the reaction zone were equal to those introduced into the said zone during the same period.

Shortly after the establishment of this state of balance, there was introduced into the catalytic mass 2.5% of its weight of fresh catalyst; then similar additions were made systematically every two days, these quantities furthermore corresponding to the losses of catalyst due to carrying-away, this latter loss having been regulated to that value.

The operation was stopped after 400 hours of stable condition of balance; the constancy of the results observed during the whole length of this period showed that it could have been prolonged for a very much greater time, while giving identical results.

During the whole of this condition of balance, the molar composition of the gases was maintained within the following limits at the inlet of the reaction zone:

| | |
|---|---|
| Acetylene | 1 |
| Chlorine | 2.20 |
| Dichlor-ethylene | 0.50 to 0.60 |
| Tetrachlor-ethylene | 3.45 to 4.00 |
| Tetrachlor-ethane | 1.20 to 1.60 |
| Pentachlor-ethane | 0.30 to 0.35 | and at the outlet of the reaction zone:

| | |
|---|---|
| Dichlor-ethylene | 0.30 to 0.60 |
| Trichlor-ethylene | 0.70 to 0.72 |
| Tetrachlor-ethylene | 3.65 to 4.20 |
| Tetrachlor-ethane | 1.20 to 1.60 |
| Pentachlor-ethane | 0.30 to 0.35 |
| Hydrochloric acid | 1.20 to 1.30 |

The molar proportion of the trichlor-ethylene in the total of the trichlor- and tetrachlor-ethylene obtained varied between 78 and 79%.

The systematic replacements of catalyst have thus enabled the consumption of catalyst to be reduced to 2.5 grams per kilogram of the mixture of trichlor- and tetrachlor-ethylene manufactured.

*Example IV*

In this operation, it was desired to obtain a small proportion of trichlor-ethylene, in the case in point, 18 mols. of trichlor-ethylene for 100 mols. manufactured.

The same reactor and the same catalyst were used as in the previous case; the gaseous mixture introduced into the reactor contained 2.7 mols. of chlorine per mol. of acetylene; the space velocity of 225 metres per hour, and the linear speed 15 cm. per sec.; the reaction temperature was maintained at 380° C. At the beginning, there was introduced into the reactor a gaseous mixture containing, per mol. of acetylene:

2.75 mols. of chlorine
0.50 mol. of dichlor-ethylene
3.15 mols. of tetrachlor-ethylene
1.20 mols. of tetrachlor-ethane
0.50 mol. of pentachlor-ethane As in the previous case, a practically stable condition of balance was rapidly reached in which the quantities of dichlor-ethylene, tetrachlor-ethane and pentachlor-ethane passing out of the reaction zone were equal to the quantities introduced into the said zone.

Additions of fresh catalyst were then made every 24 hours, each addition amounting to 1% of the total mass; to this end, the quantity of catalyst carried away was regulated so that it corresponded to the amount of these additions.

In this way, a stable condition was maintained for several hundred hours; when the operation was stopped, its duration had enabled it to be concluded with certainty that it was possible to continue that period almost indefinitely.

During this stable state, the gaseous mixtures at the inlet and at the outlet of the reaction zone varied between the following limit compositions:

At the inlet, per mol. of acetylene—

| | |
|---|---|
| Chlorine | 2.75 mols. |
| Dichlor-ethylene | 0.08 to 0.10 mol. |
| Tetrachlor-ethylene | 3.90 to 4.35 mols. |
| Tetrachlor-ethane | 1.20 to 1.60 mols. |
| Pentachlor-ethane | 0.35 to 0.40 mol. |
| Hexachlor-ethane | Traces |

At the outlet—

| | |
|---|---|
| Dichlor-ethylene | 0.08 to 0.10 mol. |
| Trichlor-ethylene | 0.15 to 0.20 mol. |
| Tetrachlor-ethylene | 4.65 to 5.10 mols. |
| Tetrachlor-ethane | 1.20 to 1.60 mols. |
| Pentachlor-ethane | 0.35 to 0.40 mol. |
| Hexachlor-ethane | Traces |
| Hydrochloric-acid | 1.75 to 1.78 mols. |

The molar proportion of trichlor-ethylene in the total quantity of trichlor- and tetrachlor-ethylene manufactured thus varied between 16 and 21% and on the average was 18%. The consumption of catalyst was reduced to 2 grams per kilogram of mixture of trichlor-ethylene and tetrachlor-ethylene obtained.

What we claim is:

1. A continuous method of production of a mixture of trichlor-ethylene and tetrachlor-ethylene containing a proportion by weight of trichlor-ethylene which is variable at will from 0% to 75%, employing the complete reaction of chlorine with acetylene in a single reaction stage without appreciable formation of heavy products and in the presence of an organic diluent which is continuously recycled, the said method including essentially the step of: passing over a fluidized granular mass of catalyst maintained as a constant temperature between 350° and 450° C., a mixture of chlorine and acetylene in proportions depending on the desired proportions of trichlor-ethylene and tetrachlor-ethylene to be produced, and an organic diluent mixture constituted by products passing out of the reaction zone other than the trichlor- and tetrachlor-ethylene formed, and mainly comprising dichlor-ethylene, tetrachlor-ethane, pentachlor-ethane and tetrachlor-ethylene, the quantities of the constituents of said diluent mixture passing out of the reaction zone being substantially equal at any moment to those introduced into said reaction zone.

2. A method according to claim 1, wherein the organic diluent mixture is formed by passing over the fluidized granular mass a mixture of chlorine, acetylene and tetrachlor-ethylene, and recycling the constituents dichlor-ethylene, tetrachlor-ethane and pentachlor-ethane resulting from the reaction until a condition of balance is obtained in which the quantities of said constituents passing out of the reaction zone are substantially equal to those introduced into said reaction zone.

References Cited in the file of this patent
UNITED STATES PATENTS

| | | |
|---|---|---|
| 2,222,931 | Basel et al. | Nov. 26, 1940 |
| 2,255,752 | Basel et al. | Sept. 16, 1941 |
| 2,538,723 | Fruhwirth et al. | Jan. 16, 1951 |
| 2,725,412 | Conrad | Nov. 29, 1955 |

FOREIGN PATENTS

| | | |
|---|---|---|
| 673,565 | Great Britain | June 11, 1952 |

UNITED STATES PATENT OFFICE
CERTIFICATE OF CORRECTION

Patent No. 2,938,931                                                  May 31, 1960

Robert Thermet et al.

It is hereby certified that error appears in the printed specification of the above numbered patent requiring correction and that the said Letters Patent should read as corrected below.

Column 1, line 71, for "Franch" read -- French --; column 4, line 51, after "trichlor-ethylene" insert -- present --.

Signed and sealed this 1st day of November 1960.

(SEAL)
Attest:
KARL H. AXLINE
Attesting Officer

ROBERT C. WATSON
Commissioner of Patents